(12) United States Patent
Jensen

(10) Patent No.: US 11,650,388 B2
(45) Date of Patent: May 16, 2023

(54) FIBER OPTIC NETWORKS HAVING A SELF-SUPPORTING OPTICAL TERMINAL AND METHODS OF INSTALLING THE OPTICAL TERMINAL

(71) Applicant: Corning Research & Development Corporation, Corning, NY (US)

(72) Inventor: Joseph Clinton Jensen, Lawndale, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/093,957

(22) Filed: Nov. 10, 2020

(65) Prior Publication Data

US 2021/0149140 A1 May 20, 2021

Related U.S. Application Data

(60) Provisional application No. 62/935,245, filed on Nov. 14, 2019.

(51) Int. Cl.
*G02B 6/44* (2006.01)
*H04B 10/25* (2013.01)

(52) U.S. Cl.
CPC ......... *G02B 6/4441* (2013.01); *G02B 6/4471* (2013.01); *H04B 10/25* (2013.01)

(58) Field of Classification Search
CPC .................................................. G02B 6/4441
See application file for complete search history.

(56) References Cited

U.S. PATENT DOCUMENTS

| | | | |
|---|---|---|---|
| 3,792,284 | A | 2/1974 | Kaelin |
| 3,912,362 | A | 10/1975 | Hudson |
| 4,148,557 | A | 4/1979 | Garvey |
| 4,167,303 | A | 9/1979 | Bowen et al. |

(Continued)

FOREIGN PATENT DOCUMENTS

| AU | 2006232206 A1 | 10/2006 |
|---|---|---|
| CN | 1060911 A | 5/1992 |

(Continued)

OTHER PUBLICATIONS

Coaxum, L., et al., U.S. Appl. No. 62/341,947, "Fiber Optic Multiport Having Different Types of Ports for Multi-Use," filed May 26, 2016.

(Continued)

*Primary Examiner* — Sung H Pak
(74) *Attorney, Agent, or Firm* — Michael E. Carroll, Jr.

(57) ABSTRACT

Fiber optic networks having a self-supporting optical terminal along with methods of installing the optical terminal are disclosed. The fiber optic network comprises an optical terminal having a housing and a tether cable attached to the housing. The tether cable is aerially supported by the tether cable of the optical terminal using a cable clamp. The fiber optic networks can aerially deploy the self-supporting optical terminal without the use of a support strand and lashing like conventional optical terminals since the optical terminal is light-weight and has a small form-factor. The tether cable may be attached to one or more mounting features of the housing and the cable clamp grips a portion of the tether cable for the aerial installation.

20 Claims, 4 Drawing Sheets

(56) References Cited

U.S. PATENT DOCUMENTS

| | | |
|---|---|---|
| 4,168,109 A | 9/1979 | Dumire |
| 4,336,977 A | 6/1982 | Monaghan et al. |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,547,937 A | 10/1985 | Collins |
| 4,615,581 A | 10/1986 | Morimoto |
| 4,634,858 A | 1/1987 | Gerdt et al. |
| 4,688,200 A | 8/1987 | Poorman et al. |
| 4,690,563 A | 9/1987 | Barton et al. |
| 4,711,752 A | 12/1987 | Deacon et al. |
| 4,723,827 A | 2/1988 | Shaw et al. |
| 4,741,590 A | 5/1988 | Caron |
| 4,842,363 A | 6/1989 | Margolin et al. |
| 4,844,570 A | 7/1989 | Tanabe |
| 4,877,303 A | 10/1989 | Caldwell et al. |
| 4,944,568 A | 7/1990 | Danbach et al. |
| 4,979,792 A | 12/1990 | Weber et al. |
| 5,007,860 A | 4/1991 | Robinson et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,131,735 A | 7/1992 | Berkey et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,210,810 A | 5/1993 | Darden et al. |
| 5,212,752 A | 5/1993 | Stephenson et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,239 A | 11/1993 | Ziemek |
| 5,276,750 A | 1/1994 | Manning |
| 5,317,663 A | 5/1994 | Beard et al. |
| 5,321,917 A | 6/1994 | Franklin et al. |
| 5,375,183 A | 12/1994 | Edwards et al. |
| 5,381,494 A | 1/1995 | O'Donnell et al. |
| 5,390,269 A | 2/1995 | Palecek et al. |
| 5,408,570 A | 4/1995 | Cook et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,920,669 A | 7/1999 | Knecht et al. |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,094,517 A | 7/2000 | Hayato |
| 6,108,482 A | 8/2000 | Roth |
| 6,112,006 A | 8/2000 | Foss |
| 6,179,482 B1 | 1/2001 | Takizawa et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,581 B1 | 3/2001 | Driscoll et al. |
| 6,224,268 B1 | 5/2001 | Manning et al. |
| 6,224,270 B1 | 5/2001 | Nakajima et al. |
| 6,293,710 B1 | 9/2001 | Lampert et al. |
| 6,298,190 B2 | 10/2001 | Waldron et al. |
| 6,321,013 B1 | 11/2001 | Hardwick et al. |
| 6,356,390 B1 | 3/2002 | Hall, Jr. |
| 6,375,363 B1 | 4/2002 | Harrison et al. |
| 6,404,962 B1 | 6/2002 | Hardwick et al. |
| 6,409,391 B1 | 6/2002 | Chang |
| 6,427,035 B1 | 7/2002 | Mahony |
| 6,428,215 B1 | 8/2002 | Nault |
| 6,466,725 B2 | 10/2002 | Battey et al. |
| 6,496,641 B1 | 12/2002 | Mahony |
| 6,522,804 B1 | 2/2003 | Mahony |
| 6,533,468 B2 | 3/2003 | Nakajima et al. |
| 6,536,956 B2 | 3/2003 | Luther et al. |
| 6,542,652 B1 | 4/2003 | Mahony |
| 6,554,489 B2 | 4/2003 | Kent et al. |
| 6,625,375 B1 | 9/2003 | Mahony |
| 6,629,782 B2 | 10/2003 | McPhee et al. |
| 6,672,774 B2 | 1/2004 | Theuerkorn et al. |
| 6,678,442 B2 | 1/2004 | Gall et al. |
| 6,695,489 B2 | 2/2004 | Nault |
| 6,702,475 B1 | 3/2004 | Giobbio et al. |
| 6,738,555 B1 | 5/2004 | Cooke et al. |
| 6,748,146 B2 | 6/2004 | Parris |
| 6,771,861 B2 | 8/2004 | Wagner et al. |
| 6,789,950 B1 | 9/2004 | Loder et al. |
| 6,841,729 B2 | 1/2005 | Sakabe et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,908,233 B2 | 6/2005 | Nakajima et al. |
| 6,916,120 B2 | 7/2005 | Zimmel et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,013,074 B2 | 3/2006 | Battey et al. |
| 7,044,650 B1 | 5/2006 | Tran et al. |
| 7,052,185 B2 | 5/2006 | Rubino et al. |
| 7,085,468 B2 * | 8/2006 | Forrester ............... G02B 6/483 385/135 |
| 7,088,899 B2 | 8/2006 | Reagan et al. |
| 7,103,255 B2 | 9/2006 | Reagan et al. |
| 7,103,257 B2 | 9/2006 | Donaldson et al. |
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,146,089 B2 | 12/2006 | Reagan et al. |
| 7,150,567 B1 | 12/2006 | Luther et al. |
| 7,171,102 B2 | 1/2007 | Reagan et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |

(56) References Cited

U.S. PATENT DOCUMENTS

| | | |
|---|---|---|
| 7,236,670 B2 | 6/2007 | Lail et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 * | 2/2009 | Reagan ............... G02B 6/4442 385/135 |
| 7,492,996 B2 | 2/2009 | Kowalczyk et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,580,607 B2 * | 8/2009 | Jones .................... G02B 6/483 385/134 |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,019 B2 | 8/2010 | Lewallen et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,663 B2 | 6/2014 | Makrides-Saravanos et al. |
| 8,758,046 B2 | 6/2014 | Pezzetti et al. |
| 8,770,861 B2 | 7/2014 | Smith et al. |
| 8,770,862 B2 | 7/2014 | Lu et al. |

(56) References Cited

U.S. PATENT DOCUMENTS

| | | |
|---|---|---|
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,557,504 B2 | 1/2017 | Holmberg et al. |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| 9,885,841 B2 | 2/2018 | Pepe |
| 9,891,391 B2 | 2/2018 | Watanabe |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,379,308 B2 * | 8/2019 | Coate .................... G02B 6/255 |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van et al. |

(56) References Cited

U.S. PATENT DOCUMENTS

| | | |
|---|---|---|
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 2001/0002220 A1 | 5/2001 | Throckmorton et al. |
| 2001/0012428 A1 | 8/2001 | Nakajima et al. |
| 2002/0012502 A1 | 1/2002 | Farrar et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0080555 A1 | 5/2003 | Griffioen et al. |
| 2003/0086664 A1 | 5/2003 | Moisel et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0157499 A1 | 8/2004 | Nania et al. |
| 2004/0206542 A1 | 10/2004 | Gladd et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2007/0031100 A1 | 2/2007 | Garcia et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |

(56) References Cited

U.S. PATENT DOCUMENTS

| | | |
|---|---|---|
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0216468 A1 | 7/2016 | Gimblet et al. |

(56) References Cited

U.S. PATENT DOCUMENTS

| | | |
|---|---|---|
| 2016/0238810 A1 | 8/2016 | Hubbard et al. |
| 2016/0246019 A1 | 8/2016 | Ishii et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0023758 A1 | 1/2017 | Reagan et al. |
| 2017/0045699 A1 | 2/2017 | Coan et al. |
| 2017/0052325 A1 | 2/2017 | Mullaney et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0031774 A1 | 2/2018 | Van et al. |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1* | 8/2018 | Pepe .................. G02B 6/3895 |
| 2018/0259721 A1 | 9/2018 | Bund et al. |
| 2018/0329149 A1 | 11/2018 | Mullaney et al. |
| 2018/0372962 A1 | 12/2018 | Isenhour et al. |
| 2019/0004251 A1 | 1/2019 | Dannoux et al. |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116958 A1 | 4/2020 | Dannoux et al. |
| 2020/0116962 A1 | 4/2020 | Dannoux et al. |
| 2020/0124812 A1 | 4/2020 | Dannoux et al. |
| 2020/0132939 A1 | 4/2020 | Coenegracht et al. |
| 2020/0174214 A1* | 6/2020 | Alves .................. G02B 6/4471 |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |

FOREIGN PATENT DOCUMENTS

| | | |
|---|---|---|
| CN | 1071012 A | 4/1993 |
| CN | 1213783 A | 4/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 101846773 A | 9/2010 |
| CN | 101939680 A | 1/2011 |
| CN | 201704194 U | 1/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| CN | 105492946 A | 4/2016 |
| CN | 106716205 A | 5/2017 |
| CN | 106873086 A | 6/2017 |
| EP | 0026553 A1 | 4/1981 |
| EP | 0244791 A2 | 11/1987 |
| EP | 0547788 A1 | 6/1993 |
| EP | 0782025 A1 | 7/1997 |
| EP | 0856751 A1 | 8/1998 |
| EP | 0957381 A1 | 11/1999 |
| EP | 1243957 A2 | 9/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |

(56) References Cited

FOREIGN PATENT DOCUMENTS

| | | |
|---|---|---|
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| FR | 2485754 A1 | 12/1981 |
| JP | 61-145509 A | 7/1986 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-297246 A | 11/1993 |
| JP | 06-320111 A | 11/1994 |
| JP | 07-318758 A | 12/1995 |
| JP | 08-292331 A | 11/1996 |
| JP | 09-135526 A | 5/1997 |
| JP | 09-325249 A | 12/1997 |
| JP | 10-339826 A | 12/1998 |
| JP | 11-064682 A | 3/1999 |
| JP | 11-281861 A | 10/1999 |
| JP | 11-326693 A | 11/1999 |
| JP | 2001-290051 A | 10/2001 |
| JP | 2003-121699 A | 4/2003 |
| JP | 2003-177279 A | 6/2003 |
| JP | 2005-031544 A | 2/2005 |
| JP | 2005-077591 A | 3/2005 |
| JP | 2005-520987 A | 7/2005 |
| JP | 2006-023502 A | 1/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2009-265208 A | 11/2009 |
| JP | 2010-152084 A | 7/2010 |
| JP | 2011-033698 A | 2/2011 |
| JP | 2013-156580 A | 8/2013 |
| JP | 2014-085474 A | 5/2014 |
| JP | 2014-134746 A | 7/2014 |
| JP | 5537852 B2 | 7/2014 |
| JP | 5538328 B2 | 7/2014 |
| JP | 3207233 U | 11/2016 |
| KR | 10-2013-0081087 A | 7/2013 |
| TW | 222688 B | 4/1994 |
| WO | 01/92927 A2 | 12/2001 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Faulkner et al. "Optical networks for local lopp applications," J. Lightwave Technol.0733-8724 7(11), 17411751 (1989).
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Wang et al. "Opto-VLSI-based dynamic optical splitter," Electron. Lett.0013-5194 10.1049/el:20046715 40(22), 14451446 (2004).
Xiao et al. "1xN wavelength selective adaptive optical power splitter for wavelength-division-multiplexed passive optical networks," Optics & Laser Technology 68, pp. 160-164, May 2015.
Liu et al., "Variable optical power splitters create new apps", Retrieved from: https://www.lightwaveonline.com/fttx/pon-systems/article/16648432/variable-optical-power-splitters-create-new-apps, 2005, 14 pages.

* cited by examiner

FIBER OPTIC NETWORKS HAVING A SELF-SUPPORTING OPTICAL TERMINAL AND METHODS OF INSTALLING THE OPTICAL TERMINAL

RELATED APPLICATIONS

This application claims the benefit of priority under 35 U.S.C. § 119 of U.S. Provisional Application Ser. No. 62/935,245 filed on Nov. 14, 2019, the content of which is relied upon and incorporated herein by reference in its entirety.

BACKGROUND

The disclosure is directed to fiber optic networks having a self-supporting optical terminal and methods of installing the self-supporting optical terminal that improve network deployment and efficiency. More specifically, the disclosure is directed to fiber optic networks having a small-form factor optical terminal that does not require a support strand and lashing wire for aerial deployments, but instead is aerially supported using an input tether cable along with methods for installing the optical terminal, Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx, 5G deployments and the like. To address this need for making optical connections in communication networks for outdoor environments hardened fiber optic connectors were developed. As used herein, the term "hardened" describes a connector or port intended for making an environmentally sealed optical connection suitable for outdoor use, and the term "non-hardened" describes a connector or receptacle port that is not intended for making an environmentally sealed optical connection such as the well-known SC connector.

Network operators face many challenges for building, deploying and connecting fiber optic connections in the outside plant communication network such as in an aerial deployment. For instance, conventional terminals or closures are typically mounted on poles or supported aerially using an additional support strand (e.g., separate support wire spanning between poles with the terminal or closure attached to the support wire) due to the size and weight of the terminal or closure. The aerial installation of the conventional terminals or closures must also be robust enough to withstand additional loading beyond its own weight loading such as handling dynamic wind loads that may induce galloping, ice loading which can contribute significantly to the weight and wind loading and the like. Consequently, fiber optic networks comprising the aerially mounted terminals or closures must handle extreme conditions for providing robust performance in the outside plant aerial environment.

Network operators may have right of way issues for installing outside plant deployments as well. For instance, a network operator may not own the poles needed for an aerial deployment and may be required to make a payment to use space on the poles for mounting terminals or closures. Besides right of way issues for the equipment, network operators may have limited space to available on existing poles for mounting terminals or closures due to congestion from utilities or other communication networks. Likewise, buried installations may have limited space availability in an existing vaults or pedestal for mounting terminals or closures or managing slack storage. In other words, deploying the terminal or closures along with the slack storage for the fiber optic cables may consume limited and valuable space or become unsightly in aerial deployments. For these reasons, the prior art fiber optic networks can have unorganized or unsightly deployments that may also take up large amounts of space in aerial or buried deployments and that may also require payments by the network operator.

Consequently, there exists an unresolved need for fiber optic assemblies in fiber optic networks that may be deployed in a space-saving manner while still allowing quick and easy deployment along with being aesthetically pleasing.

SUMMARY

The disclosure is directed to fiber optic networks having at least one optical terminal and a cable clamp for aerially supporting the optical terminal. Also disclosed are fiber optic networks comprising an optical terminal comprising cable slack storage arrangements. The concepts disclosed provide an improved deployment of optical terminals in fiber optic networks.

One aspect of the disclosure is directed to a fiber optic network comprising at least one optical terminal and a cable clamp for aerially supporting the optical terminal without using a separate support strand. The optical terminal comprises a housing, at least one tether cable attached to the housing, and a linear array of connection ports disposed on the optical terminal. The cable clamp is attached to a structure at a first end and grips a portion of the at least one tether cable at the second end so that the optical terminal is aerially supported by the at least one tether cable.

Another aspect of the disclosure is directed to a fiber optic network comprising at least one optical terminal and a cable clamp for aerially supporting the optical terminal without using a separate support strand. The optical terminal comprises a housing comprising one or more mounting features, at least one tether cable attached to the housing of the optical terminal where a portion of the tether cable is attached to the one or more mounting features, and a linear array of connection ports disposed on the optical terminal. The cable clamp is attached to a structure at a first end and grips a portion of the at least one tether cable at the second end so that the optical terminal is aerially supported by the at least one tether cable.

Yet another aspect of the disclosure is directed to fiber optic network comprising an optical terminal having a cable slack storage arrangement. The optical terminal comprises a housing having one or more mounting features disposed on an outer perimeter and a linear array of connection ports. The connection ports are suitable for making an optical connection with the optical terminal and define a connection plane aligned on respective centerlines of the linear array of connection ports, and the plurality of mounting features are at least partially disposed on the connection plane. At least one tether cable is attached to the housing of the optical terminal, and a portion of the tether cable is wrapped about the outer perimeter of the housing in one or more coils and secured to the housing using one or more of the plurality of mounting features.

A further aspect of the disclosure is directed to a method of installing an optical terminal in a fiber optic network. The method comprises: providing an optical terminal comprising a housing and at least one tether cable attached to the housing, where the housing comprises at least one mounting feature; attaching a cable clamp to a structure; securing a portion of the tether cable in the cable clamp; and attaching a portion of the tether cable to at least one mounting feature of the housing so that the optical terminal is aerially supported by the at least one tether cable.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The concepts disclosed advantageously provide fiber optic networks comprising a self-supporting optical terminal comprising a housing and a tether cable that is attached to the housing. Unlike conventional optical terminals that require lashing to support strand for aerial support, the optical terminal disclosed is aerially supported by its own tether cable using a cable clamp. Consequently, the network operator may deploy the optical terminal into a fiber optic network in a quick and efficient manner without the use of a separate strand wire for aerial support. Further, network operators may aerially deploy optical terminals without mounting the optical terminal directly to a pole. Thus, the network operator can save the time and expense when installing the optical terminal in an aerial application. Moreover, the network operator can avoid paying fees for mounting equipment to pole that they may not own and also avoid congestion of equipment on poles. The fiber optic networks disclosed are explained and depicted with reference to an explanatory optical terminal, but other suitable types of terminals or closures may use the concepts disclosed herein.

Figure 1:
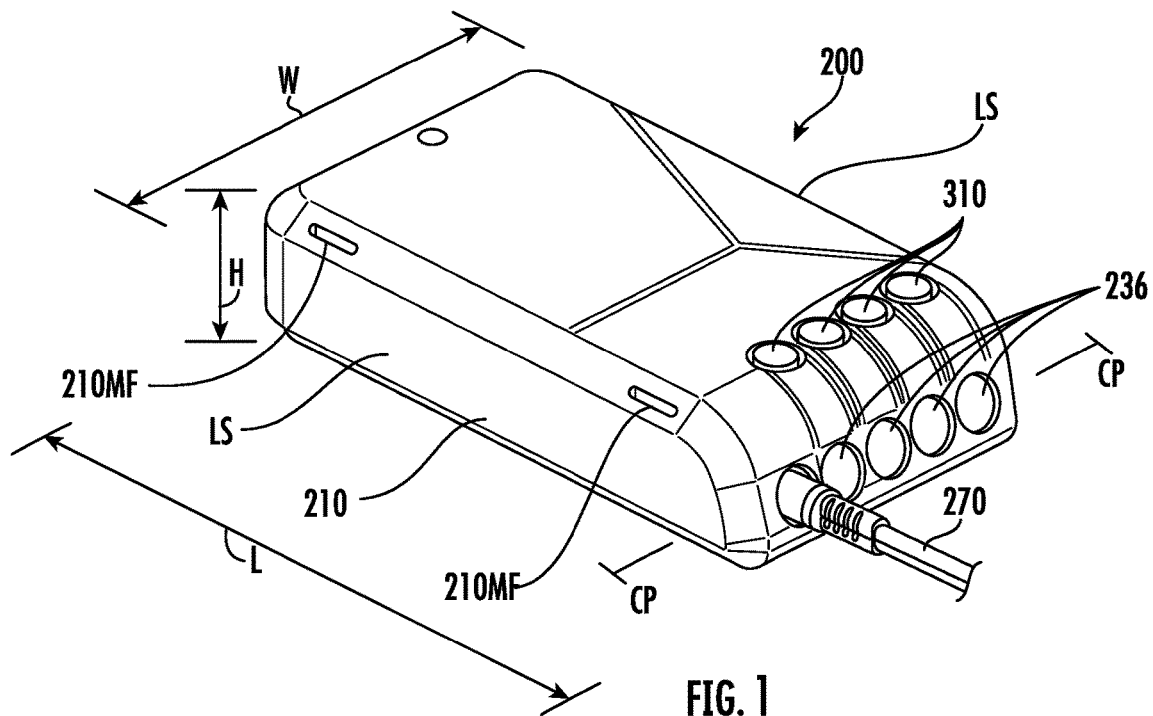
FIG. 1 is a perspective view of an explanatory optical terminal for a fiber optic network according to the disclosure.
Figure 2:
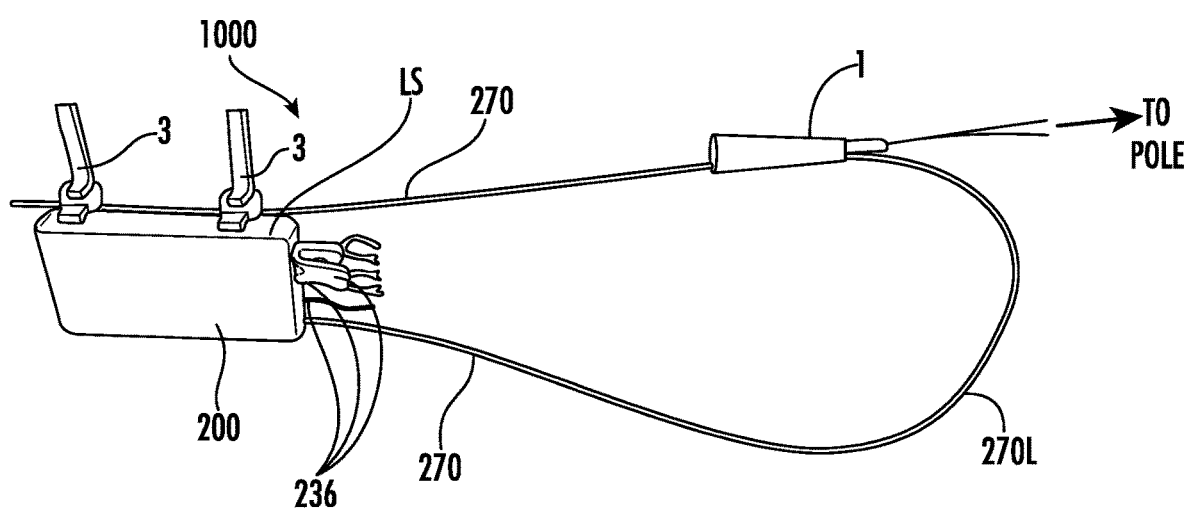
FIG. 2 depicts a portion of a fiber optic network comprising the optical terminal in an aerial deployment that is supported by the tether cable of the optical terminal according to the disclosure.
Figure 3:
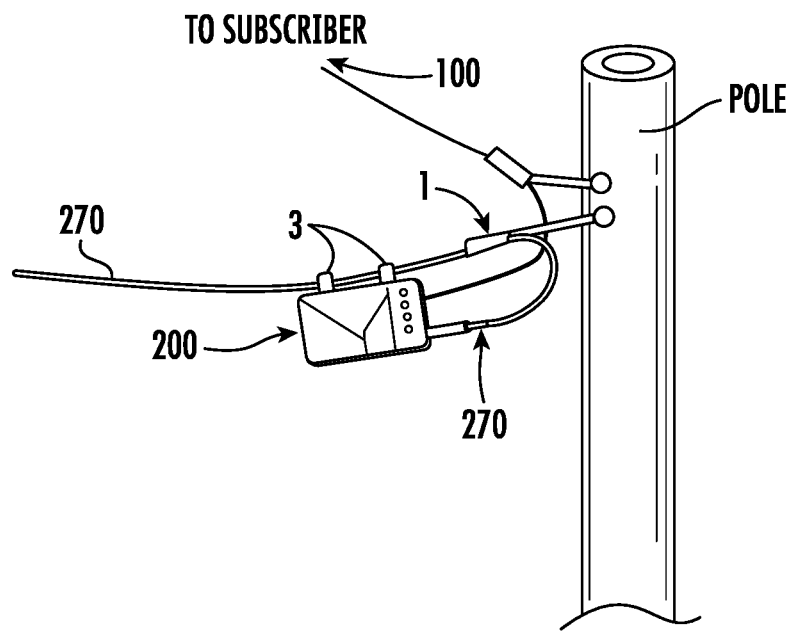
FIG. 3 shows a schematic representation of the fiber optic network having the optical terminal supported by its tether cable using a cable clamp.
Figure 4:
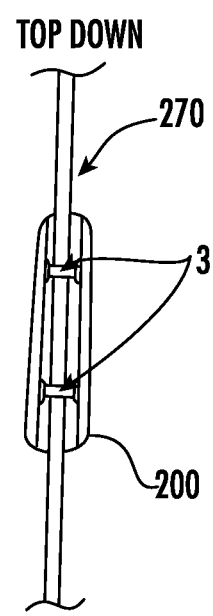
FIG. 4 shows a top down schematic view of a portion of FIG. 3 showing the housing of the optical terminal attached to its tether cable using cable ties through the mounting features of the housing according to the disclosure.
Figure 5:
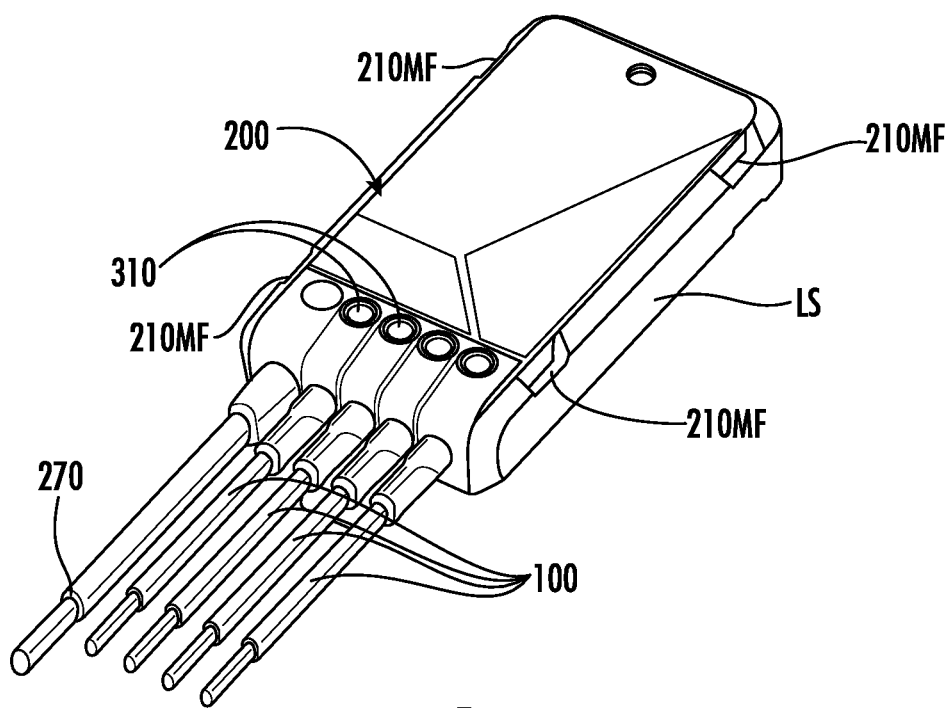
FIG. 5 is a perspective view of the optical terminal with a plurality of cable assemblies having their respective fiber optic connectors received in respective connection ports of the optical terminal.
Figure 7:
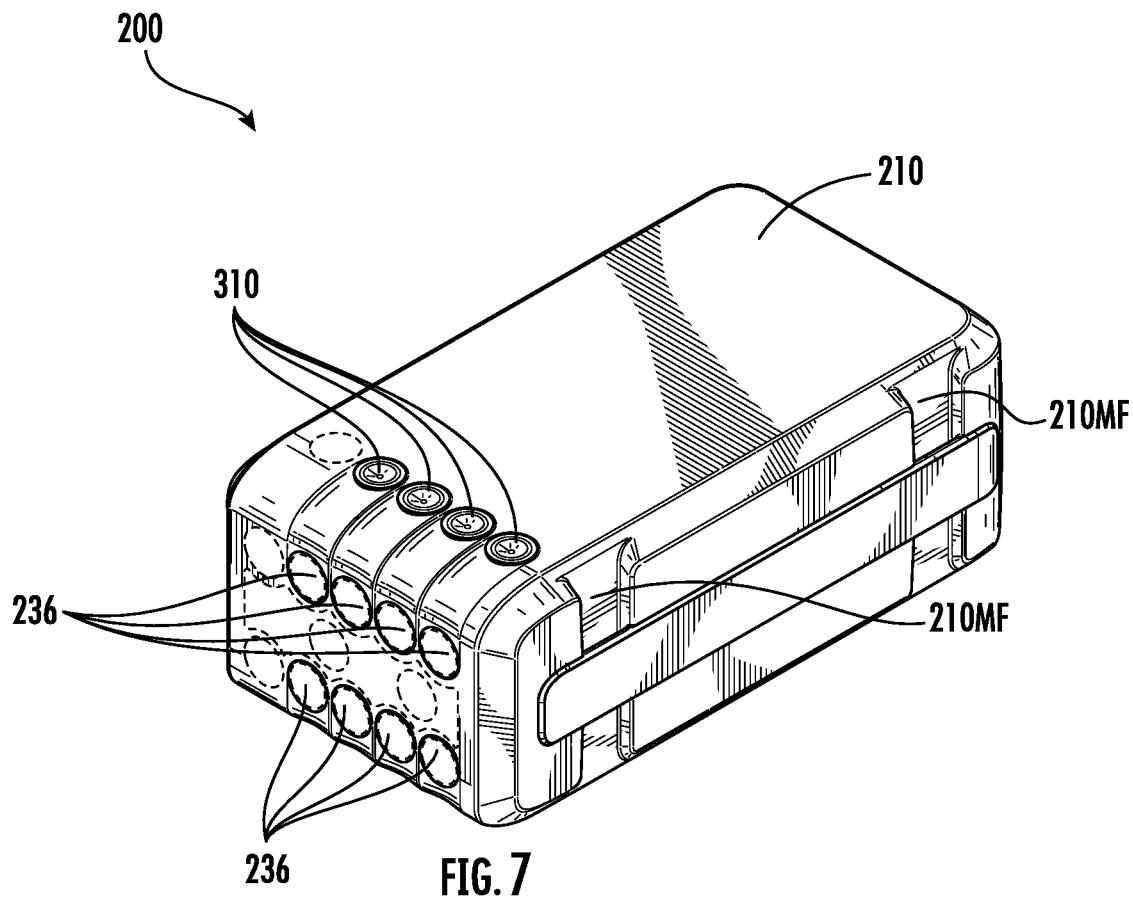
FIG. 7 is a perspective view of another optical terminal that may use the aerial installation or cable slack storage arrangement disclosed herein.

FIG. 1 shows an optical terminal 200 that may be used as a portion of a fiber optic network 1000 as depicted in FIGS. 2-4. Optical terminal 200 comprises a housing 210 and at least one tether cable 270 attached to the housing 210 of the terminal 200. The tether cable 270 may be permanently attached to the optical terminal 200 or it may have a fiber optic connector terminated on its end so that the tether cable 270 may be removed and replaced from the optical terminal if damaged. The optical terminal 200 also comprises one or more linear arrays of connection ports 236 disposed on the optical terminal 200. Connection ports 236 are suitable for making an optical connection with the optical terminal. For instance, each connection port 236 may receive a suitable fiber optic connector 10 that is terminated to an end of the fiber optic cable 90 to form the cable assembly 100 such as shown in FIG. 5. For explanatory purposes, the optical terminal 200 depicted in FIG. 1 has a single linear array of connection ports 236, but other optical terminals may have more than one linear array of connection ports 236 such as shown in FIG. 7 and use the concepts disclosed herein. Further details of an explanatory optical terminal 200 (e.g., multiport) are disclosed in PCT publication WO2019/005203, which is incorporated herein by reference.

The optical terminal 200 also comprises one or more mounting features 210MF. Mounting features 210MF are disposed on opposite sides of the housing 210. More specifically, mounting features 210MF may be disposed on both the left and right outboard sides and each side may have one or more mounting features as desired. The mounting features 210MR are shown as slots that are suitable for receiving cable ties 3 or the like, but other configurations are possible. In this embodiment, the housing 210 comprises a rectangular box form-factor and the mounting features 210MF are disposed on one or more long-sides (LS) of the rectangular box form-factor. For instance, each long side (LS) of the optical terminal 200 may have two mounting features 210MF such as depicted in FIGS. 1 and 5. Consequently, the optical terminal 200 may be attached from either side as desired and be secured at two locations for stability. However, the optical terminal may comprise one or more mounting features 210MF on other portions of the housing 210 such as the short side opposite the connection ports 236 or on the bottom or top if desired.

In this embodiment, optical terminal 200 may also comprise a plurality of actuators 310 associated with the linear array of connection ports 236. The actuators 310 are used for releasing a fiber optic connector that may be installed into the respective connection port 236. Actuators 310 may be buttons that translate to disengage a locking feature (not visible) of the connection port 236 to release the fiber optic connector. The connector ports 236 may also be configured such that the fiber optic connector is automatically secured to the optical terminal by fully seating the fiber optic connector in the connection port 236 if desired. However, optical terminal 200 may use any suitable structure for securing the fiber optic connector to the connection port 236 such as a threads, clips or other structure.

FIGS. 2-4 depict portions of a fiber optic network comprising an aerially supported optical terminal 200. As depicted in FIGS. 2 and 3, the optical terminal 200 is aerially supported by its own tether cable 270 without the need or expense of a separate support strand like conventional optical terminals. Instead, a first end of a cable clamp 1 is attached to a structure such as a pole or premises and a second end grips a portion of the tether cable 270 so that the optical terminal 200 is aerially supported by the tether cable 270. Consequently, the network operator does not need to deploy a separate support strand and lash the optical terminal 200 to the support strand like conventional installations. Conventional installations lash a cable to the support strand (e.g., wrap a filament about the cable and the support strand along the supported length) so that the cable is supported or carried by the strength of the support strand and not the cable over the span length as known to the skilled person. Nor does the network operator need to mount the optical terminal 200 directly to the pole or structure like other conventional installations.

As an alternative to the cable clamp 1, a hanger may be attached at a first end to a structure and used in a similar fashion for supporting the optical terminal 200 without gripping a portion of the tether cable 270. Instead, the second end of the hanger attaches directly to a portion of the optical terminal 200 such as the housing 210 for aerially supporting the optical terminal 200 without using a support strand. In this case, the housing 210 may have a dedicated attachment point or eyelet for the second end of the hanger.

The length that may be aerially spanned by the optical terminal in the fiber optic network disclosed herein will depend on the cable type used for the tether cable. For instance, a tether cable 270 may be a figure-8 design with a dedicated strength member in one of the lobes for spanning a longer length compared with a conventional flat cable design having smaller GRP strength members. Consequently, by varying the type of cable used for the tether cable different span lengths are possible.

Returning to FIG. 2, the tether cable 270 of the optical terminal 200 may be attached to one or more mounting features 210MF such as shown in FIG. 2. As depicted, the tether cable 270 is attached to the one or more mounting features 210MF using one or more cable ties 3 or the like. The tether cable 270 may form a portion of a loop 270L before being attached to the mounting features 210MF of the optical terminal 200. As depicted, the optical terminal 200 may be orientated so that the connection ports 236 face the pole, thereby providing easier access to the connection ports 236 for the technician that may lean a ladder against the pole. Moreover, the optical terminal 200 may be able to slide on the tether cable 270 toward the pole if the cable ties 3 are not overly tightened, thereby allowing the technician to access the optical terminal 200 closer to the pole and complete their work and then slide the optical terminal 200 back to its desired position on the tether cable 270.

Additionally, the tether cable 270 may form a portion of the loop 270L before being gripped by the cable clamp 1 as depicted. In other words, the tether cable 270 extends away from the housing 210 and then loops back toward the housing 210. For instance, the tether cable 270 may loop back toward a long-side (LS) of the housing 210 that has a rectangular box form-factor. Further, loop 270L may comprise several coils if desired for managing tether cable slack as needed.

The other end of the tether cable 270 of the optical terminal 200 may be optically connected to a distribution cable in the fiber optic network 1000 as desired. For instance, the other end of the tether cable 270 may be terminated with a fiber optic connector or it may enter into another device like a closure for optical connection. Consequently, the optical terminal 200 is installed into the fiber optic network 100 without being aerially supported using a separate support strand like conventional optical terminals.

The relatively small rectangular box-shape for the optical terminal 200 provide installation advantages for the network operator. FIG. 4 shows that the rectangular box form-factor for the optical terminal 200 the advantage of aerially supporting the optical terminal 200 in a vertical manner as well for providing a relatively small footprint for shedding water, reducing ice loading or the like. In other words, aerially supporting the optical terminal in a vertical manner provides a small footprint for reducing the gathering ice during inclement weather, and thus greatly reducing the weight that must be supported during extreme conditions.

The optical terminals 200 disclosed comprise a relatively high-density of connection ports 236 along with an organized arrangement for connectors 10 attached to the optical terminals 200. Housing 210 have a given height H, width W and length L that define a volume for the multiport as depicted in FIG. 1. By way of example, housing 210 of multiport 200 may define a volume of 800 cubic centimeters or less, other embodiments of shells 210 may define the volume of 400 cubic centimeters or less, other embodiments of shells 210 may define the volume of 100 cubic centimeters or less as desired. Some embodiments of optical terminals 200 comprise a port width density of at least one connection port 236 per 20 millimeters of width W of the optical terminal 200. Other port width densities are possible such as at least one connection port per 15 millimeters of width W of the optical terminal 200. Likewise, embodiments of optical terminals 200 may comprise a given density per volume of the housing 210 as desired.

The concepts disclosed allow relatively small form-factors for optical terminals as shown in explanatory Table 1. Table 1 below compares representative dimensions, volumes, and normalized volume ratios with respect to the conventional optical terminals having adapters disposed in the housing for receiving OptiTap® connectors that are available from Corning Optical Communications of Charlotte, N.C. for 4, 8 and 12 ports as comparative examples for the compactness of the optical terminals disclosed in the present application. Specifically, Table 1 compares examples of the conventional prior art optical terminals with optical terminals having a linear array of ports as depicted in FIG. 1. As revealed by Table 1, the respective volumes of the conventional prior art optical terminals with the same port count are on the order of ten times larger than optical terminals like those shown in FIG. 1 with the same port count as disclosed herein. By way of example and not limitation, the optical terminal 200 may define a volume of 400 cubic centimeters or less for 12-ports, or even if double the size could define a volume of 800 cubic centimeters or less for 12-ports. Optical terminals with smaller port counts such as 4-ports could be even smaller such as the housing defining a volume of 200 cubic centimeters or less for 4-ports. Optical terminals with sizes that are different will have different volumes form the explanatory examples in Table 1 and these other variations are within the scope of the disclosure. Consequently, it is apparent the size (e.g., volume) of optical terminals of the present application are much smaller than the conventional prior art optical terminals. In addition to being significantly smaller, the optical terminals of the present application are also much lighter than the conventional prior art optical terminals. Of course, the examples of Table 1 are for comparison purposes and other sizes and variations of optical terminals may use the concepts disclosed herein as desired.

One of the reasons that the size of the optical terminals may be reduced in size with the concepts disclosed herein is that the fiber optic connectors that cooperate with the optical terminals may have locking features that are integrated into the housing 20 of the connectors 10. In other words, the locking features for securing fiber optic connector are integrally formed in the housing of the connector, instead of being a distinct and separate component like a coupling nut of a conventional hardened connector used with conventional optical terminals. Conventional connectors such as OptiTap connectors for conventional optical terminals have threaded connections that require finger access for connection and disconnecting. By eliminating the threaded coupling nut (which is a separate component that must rotate about the connector) the spacing between connection ports may be reduced. Also eliminating the dedicated coupling nut from the conventional connectors also allows the footprint of the connectors to be smaller, which also aids in reducing the size of the optical terminals disclosed herein.

TABLE 1

Comparison of Conventional Optical Terminals with Optical Terminal 200

| Optical Terminal Type | Port Count | Dimension L × W × H (mm) | Volume (cm³) | Normalized Volume Ratio |
|---|---|---|---|---|
| Conventional | 4 | 274 × 66 × 73 | 1320 | 1.0 |
|  | 8 | 312 × 76 × 86 | 2039 | 1.0 |
|  | 12 | 381 × 101 × 147 | 5657 | 1.0 |
| Optical Terminal 200 | 4 | 76 × 59 × 30 | 134 | 0.10 |
|  | 8 | 123 × 109 × 30 | 402 | 0.20 |
|  | 12 | 159 × 159 × 30 | 758 | 0.14 |

As shown in FIG. 5, one or more fiber optic connectors 10 on the respective terminated ends of the cable assemblies 100 may be attached to respective ports 236 of the optical terminal 200 to form a portion of the fiber optic network 1000. Cable assemblies 100 comprises a fiber optic connector 10 terminated on an end of a fiber optic cable 90. The cable assemblies 100 are used for routing optical fibers closer to subscribers as known in the art. Optical terminal 200 may have any suitable number of connection ports 236 for receiving the fiber optic connectors 10 of respective cable assemblies 100. The connection ports 236 may be arranged as one or more linear arrays of connection ports 236 on optical terminal 200. Each linear array of connection ports 236 disposed on the optical terminal 200 define a connection plane CP aligned on the centerlines of the connection ports 236 of the linear array such as shown in FIG. 1.

Figure 6:
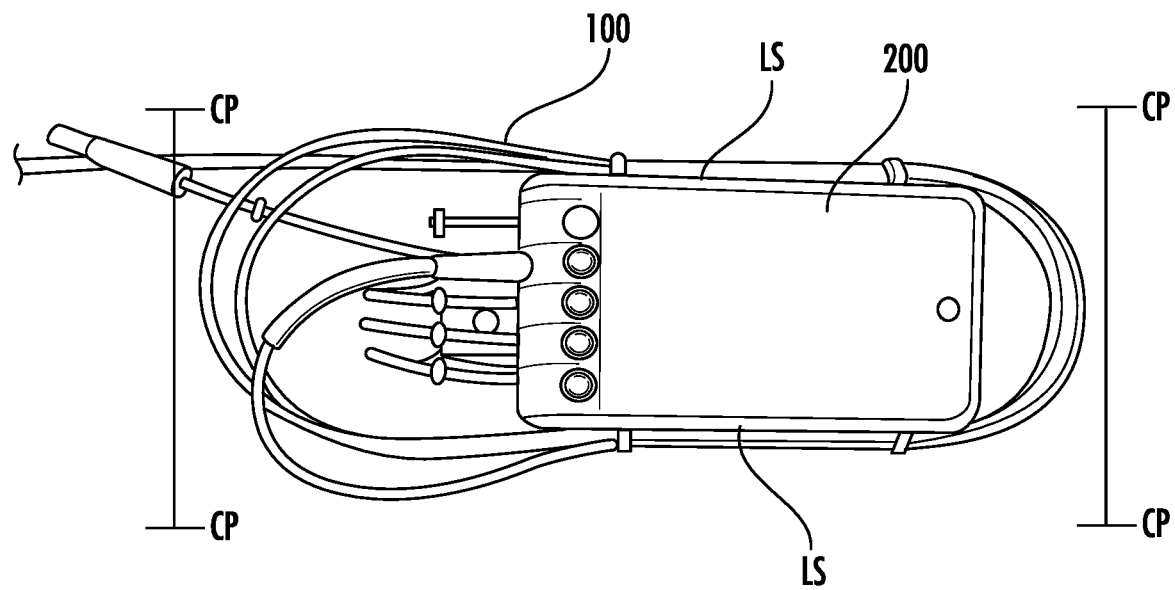
FIG. 6 is a plan view of an optical terminal having a cable slack storage arrangement using one or more mounting features of the housing.

The optical terminals 200 disclosed herein may also have advantageous cable slack storage arrangements. FIG. 6 is a plan view of an optical terminal 200 having a cable slack storage arrangement using one or more mounting features 210MF of the housing 210. As depicted, housing 210 comprises a plurality of mounting features 210MF disposed on an outer perimeter along with a linear array of connection ports 236. The connection ports 236 define a connection plane (CP) aligned on the respective centerlines of the linear array of connection ports 236 (in the plane of the paper). The plurality of mounting features are at least partially disposed on this connection plane (CP). Consequently, the tether cable 270 attached to the housing 210 may have a portion of the tether cable 270 wrapped about the outer perimeter of the housing 210 in one or more coils and secured to the housing 210 using one or more of the plurality of mounting features 210MF. For instance, the tether cable 270 may be securing to the housing using cable ties or the like for a neat and organized cable slack storage in buried, aerial or other applications. FIG. 7 depicts another optical terminal 200 that has two linear rows of connection ports 236 that may also use the concepts disclosed herein.

Figure 8:
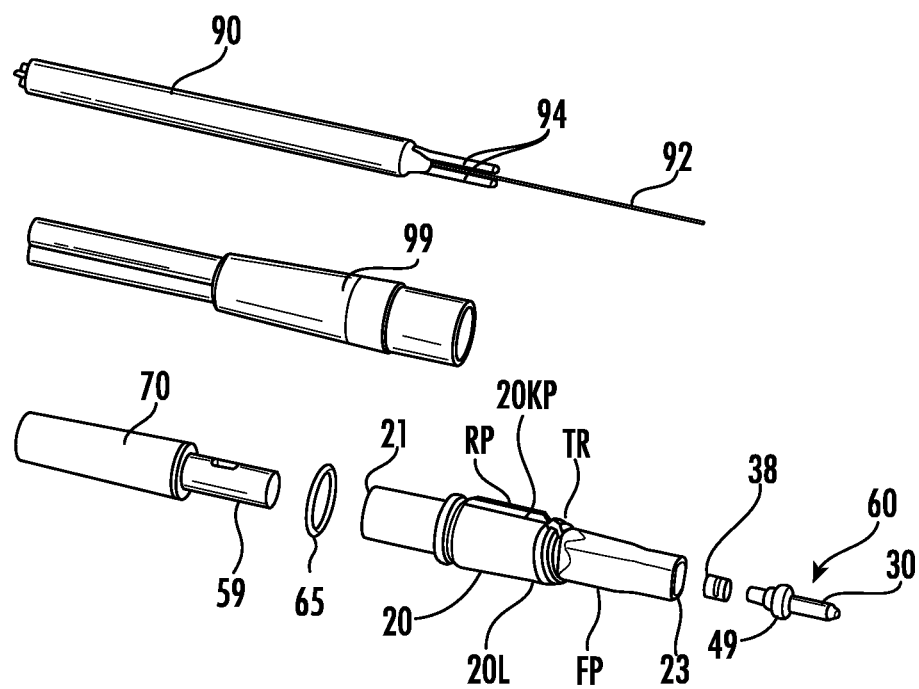
FIG. 8 is a partially exploded view of a cable assembly of FIG. 5.

FIG. 8 is a partially exploded view of a cable assembly 100 that terminates a representative fiber optic cable (hereinafter cable) 90 to a fiber optic connector 10. Further details of fiber optic connector 10 are disclosed in PCT publication WO2019/005197, which is incorporated herein by reference.

Cable 90 comprises at least one optical fiber 92 and a cable jacket 98 and may include other components or not. The cable 90 may comprises an asymmetrical cross-section having a major axis MAA and a minor axis MIA as shown in FIG. 8 or the cable may be a round cable if desired. As shown in FIG. 8, cable 90 may further comprises one or more strength members 94. The strength members 94 may be any suitable materials such as glass-reinforced rods, aramid yarns, fiberglass, metal wires or the like if used.

As shown, fiber optic connector 10 comprises a housing 20 and a ferrule 30. The housing 20 comprises a rear end 21 and a front end 23 with a longitudinal passageway 22 extending from the rear end 21 to the front end 23. The housing 20 also comprises a keying portion 20KP that may be disposed on an opposite side from a locking feature 20L or not as desired. Disposed on an opposite side means that the keying portion 20KP is about 180 degrees from the locking feature 20L in a rotational orientation about the housing 20, but other arrangements of the locking feature and keying portions are possible using the concepts disclosed herein. Ferrule 30 comprises a fiber bore 32 extending from a rear end 31 to a front end 33. The passageway 22 of housing 20 allows one or more optical fibers of cable 90 to pass through the housing 20 for insertion into fiber bore 32 of ferrule 30.

As depicted, the ferrule 30 may be a portion of a ferrule assembly 60 and the fiber optic connector 10 may also comprise a spring 38 for biasing the ferrule assembly 60 forward. The ferrule assembly 60 may comprise a ferrule holder 49 and ferrule 30. The ferrule assembly 60 may be inserted into housing 20 for assembly. Specifically, the assembly of the ferrule holder 49 and ferrule 30 are inserted into housing 20 from the front end 23 until they are retained by latch arms 20LA of housing 20. Latch arms 20LA may have ramp portions for aiding portions of ferrule holder 49 to deflect the latch arms 20LA outward as the ferrule holder 49 is inserted into housing 20 and then the latch arms 20LA spring back over ferrule holder 49 for retaining the same within the housing 20. However, other assemblies, orientations or constructions are possible for the fiber optic connector 10 according the concepts of the disclosure.

Fiber optic connector 10 may also comprise other components as desired. By way of example, fiber optic connector 10 may further comprise a cable adapter 59 that is received at a rear end 21 of housing 20 for receiving and securing cable 90. Cable adapter 59 allows different cables to be used with the housing 20. For instance, the cable adapter 59 may have an internal passageway sized and shaped for the desired cable. Other alternatives are possible for securing the cable such as using a crimp band or the like. Fiber optic connector 10 may also comprise a boot 70 that is disposed about a rear part of the connector for inhibiting sharp bending of the cable at the rear of the fiber optic connector 10.

Housings 20 of fiber optic connectors 10 may also have suitable features or structures for sealing connectors 10. The sealing plane should be located at a suitable location along the housing 20 for providing suitable environmental protection as necessary for the desired environment. Illustratively, housing 20 may include one or more grooves 20G for receiving an appropriately sized O-ring 65. Housings 20 may include other features or structures for aiding in sealing. For instance, the housing 20 may have a suitable surface for receiving a portion of a heat shrink 99 or the like for sealing between a portion of the cable 90 and the connector 10 when assembled. Any suitable heat shrink 99 may be used such as a glue-lined heat shrink. It is noted that the heat shrink 99 is depicted in its final form. Moreover, other structures or features are possible for aiding in providing a robustly sealed cable assembly 100.

Cable adapters 59 may comprise an aperture or a cable adapter key as desired. Generally speaking, cable adapter 59 comprises passageway from a cable adapter front end to a cable adapter rear end. Passageway allows the optical fiber 92 of cable 90 to pass therethrough. A shoulder (not numbered) allows cable adapter 59 to have a snug fit within the passageway 22 of housing 20 and inhibits adhesive from wicking or flowing forward of the shoulder. Any adhesive or epoxy used for securing cable adapter may wick around the recessed surface for creating a sufficient bonding area and any excessive adhesive or epoxy may flow into the aperture of cable adapter 59. Housings 20 may also include one or more apertures 29 for injecting epoxy or adhesive or the adhesive or epoxy may be placed on the cable adapter before insertion into the housing. For instance, housing may include two apertures 29 so that air may escape as adhesive or epoxy is injected. Additionally, the one or more apertures 29 may be aligned with the apertures of the cable adapter 59 so that the adhesive or epoxy also secures the strength members 94 of cable 90 to the cable adapter 59 that is secured to the housing 20, thereby forming a robust cable/connector attachment and also providing sealing at the rear end. The passageway of cable adapter 59 is sized and shaped for the particular cable 90 that is intended to be secured using the cable adapter along with the appropriate components as appropriate. The rear portion of the cable adapter 59 may comprise one or more ribs suitable for receiving a boot or overmold on the rear portion. The ribs may aid in the retention of the boot or overmold.

This embodiment also comprises a boot or overmold disposed on the rear portion of cable adapter 59 as shown. Further, when assembled a sealing element such a heat shrink 99 is disposed over the boot or overmold. The sealing element may also be disposed over a portion of the housing 20 as shown. Placing the sealing element over boot or overmold and a portion of the housing 20 allows for sealing of the cable jacket to the rear of the connector. This may also improve the bending strain-relief for the cable assembly.

Housing 20 comprises a part of the rear portion RP having a round cross-section RCS and a part of the front portion having a non-round cross-section NRCS. Housing 20 may have other features such as further comprising a transition region TR disposed between the rear portion RP and the front portion FP. The transition region TR may comprise an asymmetric portion AT. The transition region TR or asymmetric portion AT may have any suitable geometry or configuration as desired. In one embodiment, the transition region comprises a threaded portion TP. The threaded portion TP may be used for attaching a dust cap to the connector and/or for converting the footprint of the connector using other suitable components such as converting to an Opti-Tap® connector.

Housing 20 of fiber optic connector 10 comprises one or more features for alignment during mating and may also comprise other features for securing or locking the connector in a suitable connection port or device. Housing 20 may have a relatively compact form-factor such as having a length of about 40 millimeters (mm) or less and a cross-section dimension of about 15 mm or less such as 12 mm or less, but other suitable dimensions are possible for the housing. Due to the construction of housing 20, the optical terminal 200 may have the connection ports 236 arranged in a dense linear array since the connectors do not require a threaded component or bayonet for securing the connector in the port.

As used herein, the transition region TR is disposed between the rear end 21 and the front end 23 where the housing 20 makes a transformational shift in the primitive cross-sectional shapes from a part of a rear portion RP to a part of the front portion FP. As used herein, a primitive cross-section means the outer perimeter of the cross-section without regard for the internal features of the cross-section. Further, portions of the cross-sections may include other features that modify the shape of the primitive cross-sections as desired such as a keying feature, retention feature or a locking feature, while still practicing the concepts of the transition region TR or front/rear portions as disclosed herein. For instance, a front portion FP may have rounded corners or chamfered corners while still being a rectangular cross-section.

In this embodiment of housing 20, the front portion FP of housing 20 has a rectangular cross-section that provides a first orientation feature for the connectors for alignment during mating and inhibit insertion into a non-compliant device or port. The non-round cross-section NRCS has the rectangular cross-section. The rectangular cross-section provides the first orientation feature since the rectangular portion may only be inserted into a complimentary device or port in certain orientations due to its rectangular shape, thereby inhibiting incorrect insertion or insertion into non-compliant devices or ports.

The front portion FP of housing 20 depicted has more than one primitive cross-sectional shape over its length. Specifically, the front portion FP of housing 20 of also comprises another cross-section portion ACSP. By way of explanation, the another cross-sectional portion (ACSP) may comprise a SC footprint. The SC footprint can, in part, be similar to the inner housing of a conventional SC connector. This particular housing footprint is useful for allowing the connectors disclosed to be backwards compatible into existing devices or ports using well-established connector footprints as desired. Other embodiments may have fiber optic connectors configured for LC connector footprints or other known connector footprints as desired.

FIG. 8 shows the keying portion 20KP of housing 20 at the top, and on the opposite side (e.g., bottom and not visible) is the locking feature 20L of housing 20. The locking feature 20L may comprise a ramp 20R for cooperating and securing fiber optic connector 10 in the optical terminal 200. The locking feature 20L may comprise any suitable geometry for securing the connector 10 such a ramp 20R with a ledge 20LD such as shown in PCT publication WO2019/005197.

Rear portion RP may include one or more locking features that alter or modify the cross-section. For instance, housing 20 may also include locking feature 20L so that the connector may secured in an adapter, port or other suitable device. For instance, locking feature 20L may comprise features integrated into the housing such as one or more of a groove, a shoulder such as a ramp with a ledge. In these examples, the locking features 20L advantageously are integrated into the housing 20 and do not require extra components and may be used with any of the disclosed concepts. In some embodiments, the locking features 20L are subtractive portions from the primitive geometry of the rear portion RP such as a ramp or notch integrally formed in the round rear portion RP of housing 20. Consequently, having the locking features integrated into the housing 20 (e.g., monolithically formed as part of the housing) may allow denser arrays of connectors in complimentary devices. Moreover, these locking features integrated into the housing 20 are rearward of the sealing location. For example, the integrated locking features of housing 20 are disposed rearward of at least one groove 20G that seats O-ring 65. Locking feature 20L may cooperate with features of a complimentary mating device for securing the mating of the connector 10 with the complimentary mating device.

Housing 20 has features that aid in the proper alignment or orientation of the connector with the port such as markings, keys, keyways, etc. without changing the primitive form-factors of the housings that are disclosed and claimed herein. Additionally, housing may have other features for mating with a complimentary device. Thus, the features of housing 20 are used for aligning the fiber optic connector 10 within the port 236 of optical terminal 200.

Keying portion 20KP has a predetermined location with respect to an orientation of housing 20 for aligning the form-factor of the housing with a respective port on a mating device such as an optical terminal. For instance, the housing 20 or keying portion 20KP provides a proper orientation for connection in one orientation, which may be desired for connectors having angled ferrules. In this embodiment, keying portion 20KP ensures correct rotational orientation of the connector 10 during insertion into port 236 and mating with the optical terminal 200. In this embodiment, the fiber optic cable 100 is aligned to the keying feature 20K the major axis MAA of the fiber optic cable 90 is aligned in the respective port 236 of the optical terminal 200 so that the major axis of the cable 90 is perpendicular to the connection plane CP as depicted in FIG. 5. The connection plane CP is defined as passing thru the centerlines of the linear array of connection ports 236 as shown in the FIG. 1.

In this embodiment, the keying portion 20KP is configured as a female key or a subtractive portion on housing 20 such as a female keyway or a slice on the side of the connector leaving a D-shape. The keying portion 20KP extends into the transition region as shown. The keying portion 20KP cooperates with a suitable keying portion in a connection port 236 of the optical terminal 200 such as an additive or male portion for inhibiting non-compliant connectors from being inserted into the connection port. Although, the keying portion 20KP is disposed about 180 degrees from the at least one locking feature 20L, other arrangements are possible where the keying portion 20KP is disposed less than 180 degrees from the at least one locking feature 20L. In other embodiments, keying portion 20KP may be arranged as a subtractive portion that removes a side or slice of the housing 20 for creating a D-shaped cross-section over the length of the keying portion 20KP; instead of the female keyway shown. Moreover, other structures may be used for the keying portion 20KP such as a male key with the complementary structure on the optical terminal 200.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

I claim:

1. A fiber optic network, comprising:
   at least one optical terminal, comprising:
      a housing;
      at least one tether cable attached to the housing of the at least one optical terminal; and
      a linear array of connection ports disposed on the optical terminal, wherein the connection ports are suitable for receiving a fiber optic connector and making an optical connection with the optical terminal; and
   a cable clamp for aerially supporting the at least one optical terminal, the cable clamp is attached to a structure and grips a portion of the at least one tether cable so that the at least one optical terminal is aerially supported by the at least one tether cable, and the optical terminal is not aerially supported using a separate support strand.

2. The fiber optic network of claim 1, wherein the optical terminal is not mounted to a pole.

3. The fiber optic network of claim 1, the at least one optical terminal further comprising one or more mounting features, wherein the at least one tether cable is attached to the one or more mounting features.

4. The fiber optic network of claim 3, wherein the at least one tether cable is attached to the one or more mounting features using a cable tie.

5. The fiber optic network of claim 1, wherein the at least one tether cable forms a portion of a loop before being gripped by the cable clamp.

6. The fiber optic network of claim 3, wherein the housing comprises a rectangular box form-factor and the one or more mounting features are disposed on a long-side of the rectangular box form-factor.

7. The fiber optic network of claim 1, wherein the at least one tether cable is terminated with a fiber optic connector.

8. The fiber optic network of claim 7, wherein the fiber optic connector is optically connected to a distribution cable.

9. A fiber optic network, comprising:
   at least one optical terminal, comprising:
      a housing comprising one or more mounting features;
      at least one tether cable attached to the housing of the at least one optical terminal, wherein a portion of the at least one tether cable is attached to the one or more mounting features; and
      a linear array of connection ports disposed on the optical terminal, wherein the connection ports are suitable for receiving a fiber optic connector and making an optical connection with the optical terminal; and a cable clamp for aerially supporting the at least one optical terminal, the cable clamp is attached to a structure and grips a portion of the at least one tether cable so that the at least one optical terminal is aerially supported by the at least one tether cable, and the optical terminal is not aerially supported using a separate support strand.

10. The fiber optic network of claim 9, wherein the optical terminal is not mounted to a pole.

11. The fiber optic network of claim 9, wherein the at least one tether cable is attached to the one or more mounting features using a cable tie.

12. The fiber optic network of claim 9, wherein the at least one tether cable forms a portion of a loop before being gripped by the cable clamp.

13. The fiber optic network of claim 9, wherein the housing comprises a rectangular box form-factor and the one or more mounting features are disposed on a long-side of the rectangular box form-factor.

14. The fiber optic network of claim 9, wherein the at least one tether cable is terminated with a fiber optic connector.

15. The fiber optic network of claim 14, wherein the fiber optic connector is optically connected to a distribution cable.

16. A fiber optic network comprising an optical terminal having a cable slack storage arrangement, the optical terminal comprising:
a housing comprising a plurality of mounting features disposed on an outer perimeter and a linear array of connection ports, wherein the connection ports are suitable for receiving a fiber optic connector and making an optical connection with the optical terminal and define a connection plane aligned on respective centerlines of the linear array of connection ports, and the plurality of mounting features are at least partially disposed on the connection plane;
at least one tether cable attached to the housing of the at least one optical terminal, wherein a portion of the at least one tether cable is wrapped about the outer perimeter of the housing in one or more coils and secured to the housing using one or more of the plurality of mounting features, and the optical terminal is not aerially supported using a separate support strand.

17. The fiber optic network of claim 16, wherein the optical terminal comprises a plurality of actuators associated with the linear array of connection ports.

18. The fiber optic network of claim 16, further comprising a cable assembly comprising a fiber optic connector and a cable terminated to the fiber optic connector, the fiber optic connector is received in the at least one of the linear array of connection ports.

19. The fiber optic network of claim 16, wherein the optical terminal further comprises an optical splitter disposed within the housing of the optical terminal.

20. A method of installing an optical terminal in a fiber optic network, the method comprising:
providing an optical terminal comprising a housing and at least one tether cable attached to the housing, wherein the housing comprises at least one mounting feature and a linear array of connection ports disposed on the optical terminal, wherein the connection ports are suitable for receiving a fiber optic connector and making an optical connection with the optical terminal;
attaching a cable clamp to a structure;
securing a portion of the at least one tether cable in the cable clamp; and
attaching a portion of the at least one tether cable to at least one mounting feature of the housing so that the optical terminal is aerially supported by the at least one tether cable without aerial support from a separate support strand.

* * * * *

UNITED STATES PATENT AND TRADEMARK OFFICE
CERTIFICATE OF CORRECTION

PATENT NO. : 11,650,388 B2
APPLICATION NO. : 17/093957
DATED : May 16, 2023
INVENTOR(S) : Joseph Clinton Jensen It is certified that error appears in the above-identified patent and that said Letters Patent is hereby corrected as shown below:

On the Title Page

On the page 8, in Column 2, under "Other Publications", Line 1, delete "lopp" and insert -- loop --.

On the page 8, in Column 2, under "Other Publications", Line 7, delete "—Poeceedings" and insert -- —Proceedings --.

Signed and Sealed this
Twenty-first Day of November, 2023

Katherine Kelly Vidal
*Director of the United States Patent and Trademark Office*